US006771808B1

(12) United States Patent
Wallack

(10) Patent No.: US 6,771,808 B1
(45) Date of Patent: Aug. 3, 2004

(54) SYSTEM AND METHOD FOR REGISTERING PATTERNS TRANSFORMED IN SIX DEGREES OF FREEDOM USING MACHINE VISION

(75) Inventor: Aaron S. Wallack, Natick, MA (US)

(73) Assignee: Cognex Corporation, Natick, MA (US)

( * ) Notice: Subject to any disclaimer, the term of this patent is extended or adjusted under 35 U.S.C. 154(b) by 573 days.

(21) Appl. No.: 09/737,836

(22) Filed: Dec. 15, 2000

(51) Int. Cl.$^7$ .............................. G06K 9/46; G06T 3/00
(52) U.S. Cl. ....................... 382/151; 382/215; 382/216; 382/289
(58) Field of Search ................................. 382/151, 199, 382/215, 216, 289, 290, 294; 348/87, 95, 126

(56) References Cited

U.S. PATENT DOCUMENTS

| | | | | |
|---|---|---|---|---|
| 5,459,636 A | * | 10/1995 | Gee et al. | 364/516 |
| 5,621,807 A | * | 4/1997 | Eibert et al. | 382/103 |
| 5,793,901 A | * | 8/1998 | Matsutake et al. | 382/294 |
| 5,974,365 A | | 10/1999 | Mitchell | 702/150 |
| 6,137,893 A | | 10/2000 | Michael et al. | 382/103 |
| 6,173,066 B1 | * | 1/2001 | Peurach et al. | 382/103 |
| 6,173,070 B1 | | 1/2001 | Michael et al. | 382/145 |

OTHER PUBLICATIONS

"A Tutorial on Visual Servo Control" Seth Hutchinson, Greg Hager and Peter Corke, May 14, 1996; 42 pages.
David I. Havelock, *Geometric Precision in Noise–Fee Digital Images*, IEEE Transactions on Pattern Analysis and Machine Intelligence, vol. II, No. 10, Oct., 1989.
Alfred M. Bruckstein, Larry O'Gorman and Alon Orlitsky, *Design of Shapes for Precise Image Registration*, IEEE Transactions on Information Theory, vol., 44, No. 7, Nov. 1998.
Lawrence O'Gorman, *Subpixel Precision of Straight–Edged Shapes for Registration and Measurement*, IEEE Transactions on Pattern Analysis and Machine Intelligence, vol. 18, No. 7, Jul. 1996.
W. Makous, *Optimal Patterns for Alignment*, Applied Optics, vol. 13, No. 3, Mar. 1974.
Neal T. Sullivan, *Semiconductor Pattern Overlay*, Digital Equipment Corp., Advanced Semiconductor Development, Critical Reviews vol. CR52.
John W. Hill, *Machine Intelligence Research Applied to Industrial Automation*, U.S. Department of Commerce, National Technical Information Service, Nov. 1980.

* cited by examiner

Primary Examiner—Brian Werner
(74) Attorney, Agent, or Firm—William Loginov

(57) ABSTRACT

A system and method for utilizing a search tool that registers transformation of a trained pattern by at least four degrees of freedom to register the instance of a pattern in an arbitrary six-degree-of-freedom pose is provided. The search tool is first trained to recognize a plurality of versions of a trained pattern/fiducial that are incrementally transposed to induce differing levels of known aspect and shear. An object having several instances of the trained pattern located at known spacings and orientations therebetween is imaged by the trained search tool, and the located instances of the trained pattern are compared to expected instances of the trained pattern to measure relative six-degree-of-freedom orientation for the underlying object.

17 Claims, 7 Drawing Sheets

SYSTEM AND METHOD FOR REGISTERING PATTERNS TRANSFORMED IN SIX DEGREES OF FREEDOM USING MACHINE VISION

BACKGROUND OF THE INVENTION

1. Field of the Invention

This invention relates to machine vision systems and more particularly to uses for advanced machine vision search tools that register patterns transformed by multiple degrees of freedom.

2. Background Information

The use of advanced machine vision systems and their underlying software is increasingly employed in a variety of manufacturing and quality control processes. Machine vision enables quicker, more accurate and repeatable results to be obtained in the production of both mass-produced and custom products. Basic machine vision systems include one or more cameras (typically having solid-state charge couple device (CCD) is imaging elements) directed at an area of interest, frame grabber/image processing elements that capture and transmit CCD images, a computer and display for running the machine vision software application and manipulating the captured images, and appropriate illumination on the area of interest.

Many applications of machine vision involve the inspection of components and surfaces for defects that affect quality. Where sufficiently serious defects are noted, a part of the surface is marked as unacceptable/defective. Machine vision has also been employed in varying degrees to assist in manipulating manufacturing engines in the performance of specific tasks. One task using machine vision is visual servoing of robots in which a robot end effector is guided to a target using a machine vision feedback. Other applications also employ machine vision to locate a stationary and/or moving pattern.

The advent of increasingly faster and higher-performance computers, has enabled the development of machine vision systems that employ powerful search tools. Such search tools enable a previously trained/stored image pattern to be acquired and registered/identified regardless of its viewed position. In particular, existing commercially available search tools can register such patterns transformed by at least three degrees of freedom, including two translational degrees (x and y-axis image plane) and a non-translational degree (rotation and/or scale, for example). One particular implementation of an advanced search tool is the rotation/scale-invariant search (RSIS) tool. This tool registers an image transformed by at least four degrees of freedom including the two translational degrees (x and y-axis image plane) and at least two non-translational degrees (z-axis (scale) and rotation within the x-y plane about an axis perpendicular to the plane). Some tools also register more complex transformations such as aspect ratio (rotation out of the plane whereby size on one axis decreases while size in the transverse axis thereto remains the same). These search tools, therefore, enable a specific pattern within the field of view to be located within a camera field of view to be positively identified and located accurately within the vision system's internal reference system (an x, y, z, rotation coordinate system, for example). The RSIS and other advanced search tools particularly allow for the identification and acquisition of patterns having somewhat arbitrary rotation, scaling (e.g. distancing) and translation with respect to the reference system. In other words, the tool is sufficiently robust to recognize a desired pattern even if it is rotated and larger/smaller/skewed relative to a "model" or trained pattern within the vision system.

In general, advanced machine vision tools acquire an image of a pattern via a camera and analyze the outline or a particular part of the pattern, such as a predetermined fiducial mark. The processing speed of the underlying computer in which the tool resides is sufficient to enable a very large number of real time calculations to be completed in a short time frame. This particularly enables the search tool to determine the coordinates within an image reference system for each analyzed point in the viewed area, and correlate these through repetition with a desired pattern. The search tool may map the locations of various points in the captured image to stored points in the model image, and determine whether the captured image points fall within an acceptable range of values relative to the model image points. Using various decision algorithms, the tool decides whether the viewed pattern, in a particular rotation and distance (scale) corresponds to the desired search pattern. If so, the tool confirms that the viewed pattern is, in fact, the pattern for which the tool is searching and fixes its position and orientation.

Machine vision systems having a four-degree-of-freedom, or greater, capability (such as RSIS) are available from a number of commercial vendors including Hexavision® from Adept Technology, Inc. of San Jose, Calif., and the popular Patmax® system from Cognex Corporation of Natick, Mass. Advanced machine vision search tools such as Patmax® also have the ability to take advantage of the previous known position of a search subject or target. This narrows the search area to positions relatively near the last known location. Therefore, searching is relatively faster on the next cycle since a smaller area is searched. In addition, these search tools can tolerate partial occlusion of a pattern and changes in its illumination, adding further to their robustness with respect to less advanced machine vision approaches.

In general, when a camera views an object, it resolves an imaged pattern on the object into an image plane that, as defined herein, is represented by the x and y axes of a three-dimensional coordinate system. These are two translational axes in which the camera can register transformation of the pattern directly based upon observed position within the overall camera field of view. In addition, the camera axis perpendicular to the image plane can be represented as the z-axis, which, as noted is generally represented as a non-translational scale measurement (the larger the pattern, the closer it is to the camera and vice versa). This axes can also be measured by a special ranging camera. The three orthogonal axes (x, y and z) define three degrees of freedom with respect to the viewed object. In addition rotation of the viewed pattern of the object about three axes (typically characterized as roll, pitch and yaw rotations ($\psi$, $\phi$, $\theta$) about the respective (x, y, z) axes) can also be present with respect to the image plane. These rotations account for three additional degrees of freedom. When an object is rotated by $\theta$, it appears, likewise rotated about the z/camera axis in the image plane with no change in width-along the image-plane other axes. When it is rotated about only one of either $\psi$ or $\phi$, it appears to have a changed aspect ratio (i.e. narrowed along one image plane axis as it rotates about the opposing image plane axis. Note that this form of rotation actually changes the viewed outline of the pattern with respect to the search tool's reference frame (i.e. a circle becomes an oval). If rotation about both image-plane axes occurs, then the pattern shows a shear. Using a four-degree-of-freedom search tool, it can be difficult to accurately register and locate a trained pattern that exhibits transformation along all six degrees of freedom including aspect and shear with respect to the image plane, as the trained pattern, itself undergoes change to its overall shape and size in a manner that may not be easily predicted or recognized by a search tool.

Accordingly, it is an object of this invention to provide a system and method for measuring patterns transformed by six degrees of freedom using a machine vision search tool having, generally the ability to register patterns transformed by four degrees of freedom. The system and method should enable training and registration of a pattern particularly based upon transformations along degrees of freedom that are not readily accommodated by the underlying machine vision search tool including aspect and shear.

SUMMARY OF THE INVENTION

This invention overcomes the disadvantages of the prior art by providing a system and method for utilizing a search tool that finds and/or registers (finds and locates) transformation of a trained pattern by at least four degrees of freedom to register the instance of a pattern in an arbitrary six-degree-of-freedom pose.

According to a preferred embodiment the system is first trained by providing multiple patterns corresponding to different aspect and shear (pan and tilt) with respect to an original template pattern. In one embodiment, training can involve a synthetic (or physical) panning and tilting of the template pattern to generate the desired plurality of instances of the trained pattern at different amounts of aspect/shear aspect (e.g. the two degrees of freedom not handled by a four-degree-of freedom search tool). In an alternate embodiment, in cases where the search tool allows a user to specify differing levels of aspect/shear with respect to an image, training can entail the storage of a particular template pattern that is subsequently transformed based upon the user-specified aspect/shear.

Once the search tool has been trained with the appropriate training patterns, the search tool is directed to acquire an image of an object containing one or more instance of the trained pattern(s). In a preferred embodiment, the instances of the trained pattern are found, and located (e.g. registered) so that the six-degree-of-freedom pose of the underlying object can be determined.

According to one embodiment, a single instance of a fiducial or trained pattern on the object can be imaged and registered. The search tool can be run using the image with each of a plurality of trained patterns, each trained pattern representing a differing aspect/shear. The result from each run can be scored, and the score that is highest can be identified as the prevailing aspect and shear associated with the object. Score can be determined based upon interpolation, using a parabolic fit of a given highest-scoring fiducial versus close neighbors on a parabola. Alternatively, a gradient descent can be used to determine the closest-matching training fiducial in terms of aspect and shear to the runtime image fiducial.

According to another embodiment multiple fiducials or subpatterns of a fiducial on the object are located based upon the trained pose information therefor and the relative six-degree-of-freedom pose is measured by providing a transformation between the located positions for other fiducials/subpatterns with respect to the base fiducial/subpattern and the expected positions for other fiducials/subpatterns with respect to a base fiducial/subpattern. The resulting position/orientation of the object is then determined.

It is contemplated that the fiducials/subpatterns according to this invention can be found only, (e.g. not also located/registered) according to an alternate embodiment, using the techniques described herein.

BRIEF DESCRIPTION OF THE DRAWINGS

The foregoing and other object and advantages of the invention will become clearer with reference to the following detailed description as illustrated by the drawings in which.

DETAILED DESCRIPTION OF AN ILLUSTRATIVE EMBODIMENT

Figure 1:
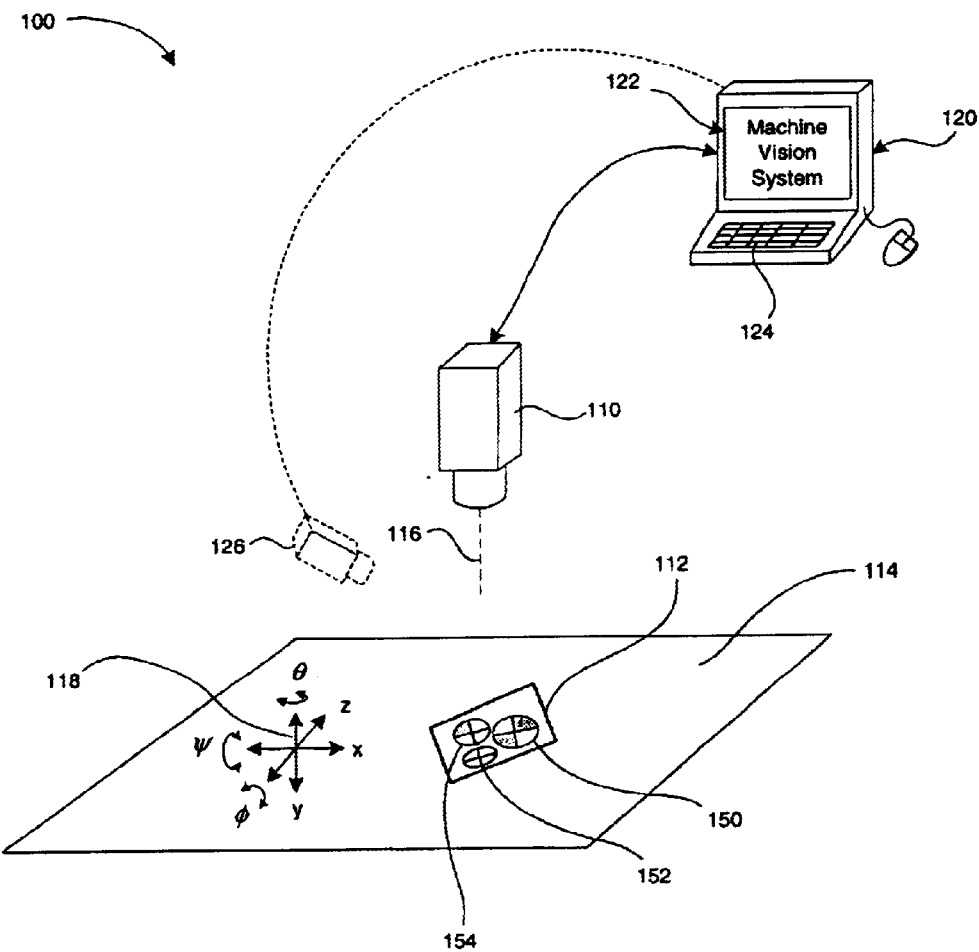
FIG. 1 is a schematic perspective view of a machine vision system and associated object viewed by the system, in which the object is transformed by six degrees of freedom with respect to the system's reference frame.

FIG. 1 shows a generalized setup 100 in which a camera assembly 110 is directed at an object 112 located within a work area 114, in which the object lies within the field of view of the camera as defined generally as a region about the camera axis 1 16. This camera axis defines a relative search tool reference frame/system that is represented by the set of axes 118.

The exemplary camera assembly 110 includes an imaging device such as a solid-state charge-couple device (CCD) and an appropriate image capture device/processor such as a framegrabber. The camera is interconnected with a computer system 120 having a display 122 and a graphical user interface manipulated by a keyboard 124, mouse and/or similar devices. Residing on the computer 120 is a machine vision system and related software as described further below. Note that the term "software," as used herein refers generally to any number of actions and data structures, whether implemented by a general-purpose processor or any an application-specific or custom processor (example—firmware. It is expressly contemplated that additional camera assemblies can be interconnected (see phantom camera and link 126) with the computer 120 and directed at the work area 114 and/or object 112. These cameras can be selected for imaging the object when appropriate, such as when a predetermined portion of the object is at a non-viewable orientation/pose with respect to the illustrated camera assembly 110.

As described above the x and y-axes define the image plane with respect to the orthogonal z-axis (camera axis 116). For a conventional non-ranging camera, the z-axis is representative of scale since translation of an image along the z-axis appears as a relative change in viewed image size rather than a defined coordinate translation. Similarly, any transformation of the image along orthogonal x and y-axes are viewed as a change in the relative location of the image within the applicable camera field of view. In addition, rotation about the respective camera axis 130, 132 (z(scale)-axis), within the image plane, is denoted as angular rotation (θ). The degree of rotation (θ) is accordingly viewed as a relative rotation in the viewed image pattern.

The camera 110 transmits captured images within its field of view to a commercially available machine vision system capable of acquiring a respective image from each of at least two separate camera assemblies. The machine vision system according to this invention includes a search tool adapted to register a pattern, based upon a trained image thereof, transformed by at least four degrees of freedom—at least two translational degrees (x and y axes/image plane) and at least two non-translational (typically rotation θ in the x-y plane and z(scale)) degrees of freedom. Note that a basic search tool registering transformation of a pattern in two translational (x, y) degrees of freedom can be implemented according to an alternate embodiment described below. For the purposes of the preferred embodiment, however, an exemplary search tool that registers transformation of an acquired image by at least four degrees of freedom including the two translational degrees (x, y) and two non-translational degrees (rotation θ and z(scale)) is the rotation/scale-invariant search (RSIS) tool such as the above-referenced Patmax® or Hexavision® system.

Note by "translational" it is meant, viewed linear displacement in an image plane clearly viewed by the camera, while "non-translational" means a change in the viewed image outside the parameters of the image plane such as general rotation of the image, change in size/scale due to movement toward and away from the camera, change in aspect ratio (rotation outside the image plane in one axis lying in the plane) and change in shear (simultaneous rotation outside the plane in two planar axes). In general, the search tool of the present embodiment is adapted to view the z(scale) axis as a non-translational degree of freedom.

Additionally, as used herein, the term "find" or "finding" in the context of the search tool shall refer to the process of looking for an instance of a selected pattern in an acquired image, and reporting whether such an instance of the pattern has occurred. "Locate" or "locating" shall, in this context, refer to the performance of measurements of found instances of the pattern, and "register" or "registering" shall refer to the combination of finding and locating of the pattern by the search tool.

In order to determine the three-dimensional location of an object, the camera is first trained to recognize a specific pattern that, according to this embodiment, defines a fiducial mark having a distinctive design and recognizable orientation. This fiducial is placed upon, or is part of the underlying object to be located by the system. The exemplary fiducial shown in FIG. 1 defines a circle 150 having alternating light and dark quadrants. However, any pattern which can be registered within the selected degrees of freedom can be used as a fiducial according to this invention. Other examples of fiducials can, therefore, include a unique object shape/outline, a logo on the object, or a particular structure/extension attached to the object. In general, the search tool uses previously trained pattern data in order to register a pattern in a currently viewed image. In other words, the software in the search tool attempts to "recognize" an instance of the trained pattern in the viewed/acquired image.

As described further below, the object can include multiple fiducials, such as fiducials 152 and 154 on selected surfaces.

The following is a description of a technique that enables the exemplary search tool (an RSIS tool, for example), which capable of registering transformation of a pattern by four degrees of freedom, to successfully identify and locate instances of the trained pattern in arbitrary six-degree-of freedom poses. Note that the exemplary object 112, and underlying fiducials 150, 152, 154 are disposed at a shear ($\phi \neq 0$, $\psi \neq 0$) implicating all six degrees of freedom.

Briefly, the first part of the invention involves acquiring images of multiple patterns corresponding to synthetically panning and tilting the original pattern to thereby train the search tool with respect to the patterns. Then, the search tool procedure is run to search for all of the different patterns in the image. The second part of the invention involves registering multiple fiducials (or different parts of the same fiducial) in order to measure relative positions from which to measure shear and aspect (e.g. the two degrees of freedom not handled by a four-degree-of freedom search tool).

Figure 2:
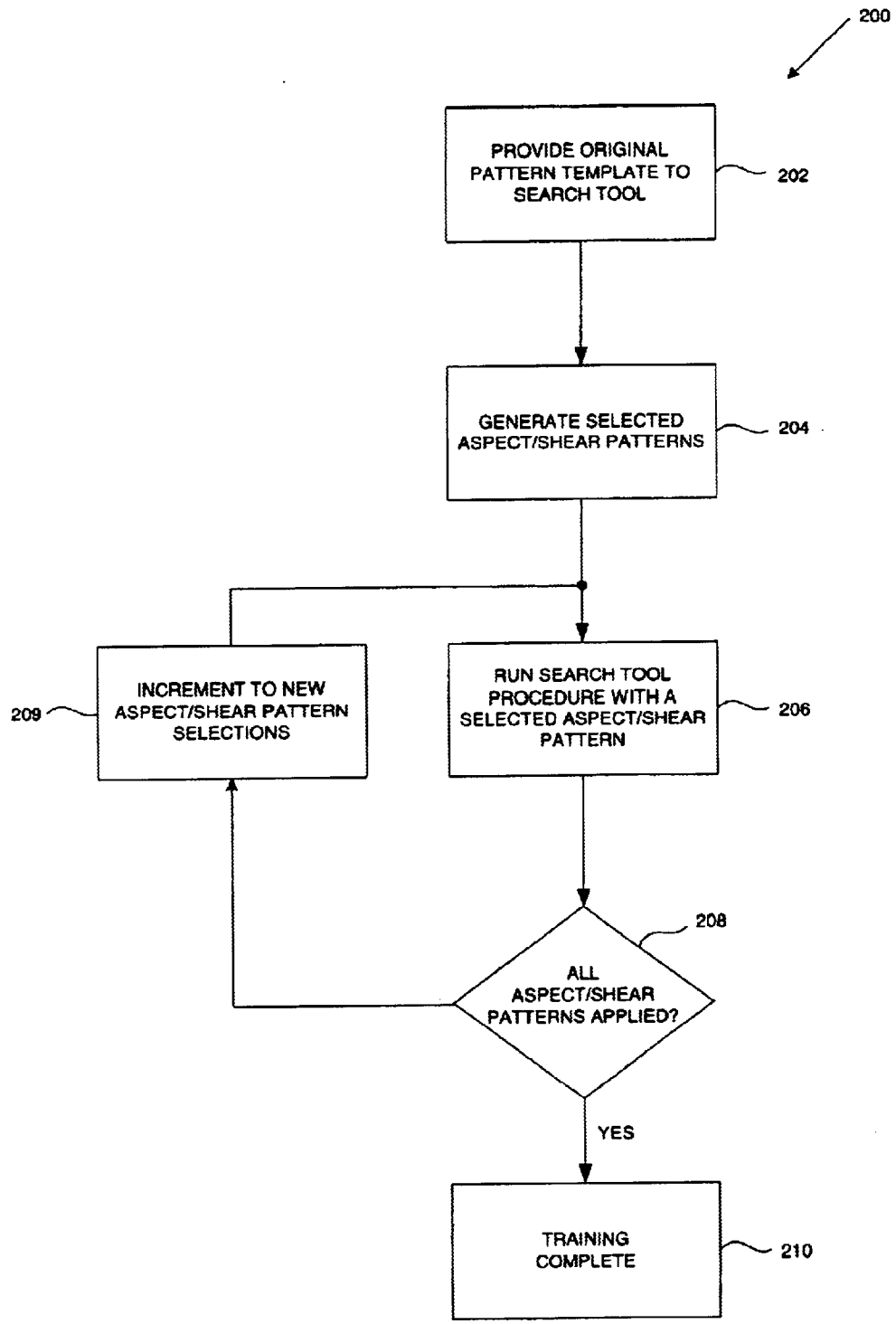
FIG. 2 is a flow diagram detailing a procedure for calibration a machine vision search tool so as to recognize transformation of a pattern in three dimensions.
Figure 3:
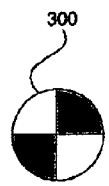
FIG. 3 is a plan view of an exemplary fiducial pattern for training the search tool.

FIG. 2 details a procedure 200 for training the search tool in view of instances of patterns in arbitrary six-degree-of-freedom poses. First, an initial pattern to be registered by the search tool, and, accordingly, applied to an object is provided. In this embodiment, the pattern is the fiducial 300 shown in FIG. 3 consisting of alternating light and dark quadrants. However, the pattern to be trained and located can be any acceptable shape that can be sufficiently discerned by the search tool including a logo or structure on the object or an underlying shape of the object itself. In this example, the pattern/fiducial comprises a circle. A template of the pattern is made (step 202) from the basic pattern viewed in a perpendicular plane to the camera axis as shown in FIG. 3.

It is contemplated that search tool training, for the purposes of this embodiment, can be accomplished using only one fiducial pattern template—while a plurality of fiducials (typically similar fiducials) may be present on the actual object being located during a run of the search routine. Initial training with one fiducial/pattern involves the positioning of the pattern so that it is substantially orthogonal to the camera axis (e.g. $\psi = \phi = 0$).

Figure 4:
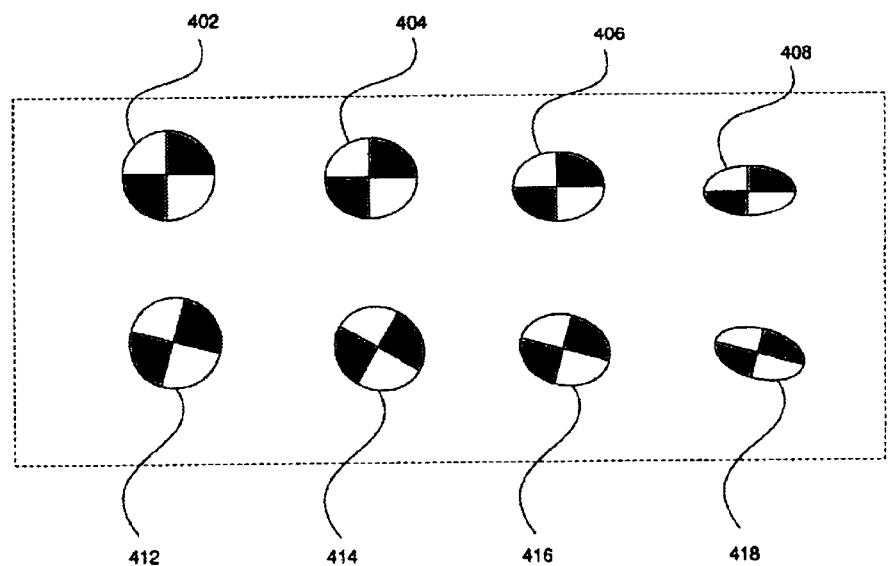
FIG. 4 is a plan view of a plurality of exemplary fiducial patterns based upon the pattern of FIG. 3 for training the fiducial, in which the patterns are transformed by varying degrees of aspect and shear.

Given an original pattern template (which can be an acquired fiducial on the object), multiple aspect/shear patterns are then generated, which warp the original pattern template (step 204). This can be performed by physically rotating a surface containing the template in the presence of a camera, or by synthetically altering the shape of the pattern using an appropriate three-dimensional drawing software application. As an alternative to synthetically/physically generating various pan and tilt (aspect/shear) patterns from the template for training purposes, certain search tools (such as Patmax®) enable a user to specify a given value aspect/shear for an image. Even though the tool does not search over a number of aspects/shears, a selected value can be entered by the user, and retraining of the tool in view of this input is not required. Accordingly, training procedure steps 204-onward can be adapted for search tools that accommodate runtime input of specific aspect/shear values.

Where the training procedure 200 of FIG. 2 is fully applied, reference is also made to FIG. 4, which shows patterns that are generated by synthetically warping the pattern to have different aspect and shear values. In particular patterns 402, 404, 406 and 408 show a change aspect ratio, that can be incremented according to a predetermined relationship, such as rotation by ten-degree increments from 0 degrees (pattern 402) to 40 degrees (pattern 408). Likewise, patterns 412, 414, 416 and 418 can be generated with differing levels of shear. Various combinations of aspect and shear can be generated, so that a large number of incremental, known levels of aspect and shear are provided.

Then, the search tool procedure is run to find the pattern in arbitrary poses (step 206). In particular, the search tool is run multiple times with each of the multiple template patterns corresponding to the different synthetic aspect/shears until all desired patterns have been run (decision step 208). Each time the procedure runs through a pattern, it increments to select the next pattern in the run (step 209). These patterns are provided as synthetic image data, preferably. Alternatively, the patterns can be provided as a series of actual image acquired by the camera, as noted generally above. However, since a run consisting of a large number of patterns is desired, the used of a succession of synthetic images is preferred. Once all patterns have been run through, and located, the training stage is complete (step 210).

Note that, during training, the user can specify the range of aspects and shears that will be required (just as the user can specify the range of expected orientations and scales for commercially available RSIS/search tools). The user can also specify the "step" or increment size, thereby defining which aspect ratios will be handled (i.e., aspects={0.85, 0.9, 0.95, 1.0, 1.05, 1.1, 1.15})

Note also that the above-described training procedure can also be applied to subpatterns in one or more patterns/fiducials. For example, semi-circles can be trained in a variety of aspect and shear orientations.

While the creation of a synthetic pattern including various degrees of shear and aspect is described, it is expressly contemplated that certain search tools, such as the above-described Patmax® enable a user to specify a linear transform to apply to the s training procedure and/or the acquired runtime image, thus obviating the need for synthetic shear/aspect images. Accordingly, training in the presence of this transform does not entail training multiple patterns, but rather, running the search tool with different inputs that are each derived from the transform acting upon the single trained pattern.

Having described the training of the search tool to recognize patterns at different aspect and shear orientations, the location and measurement of aspect and shear to define the orientation and position of an underlying object is now described in further detail.

It is contemplated that either a single pattern/fiducial, or multiple patterns/fiducials can be alternatively employed according to this invention to determine the six-degree-of-freedom pose of an underlying object. The following is a description of procedures for determining the pose from a single fiducial/pattern and from multiple (example—three) fiducials/patterns.

Figure 5:
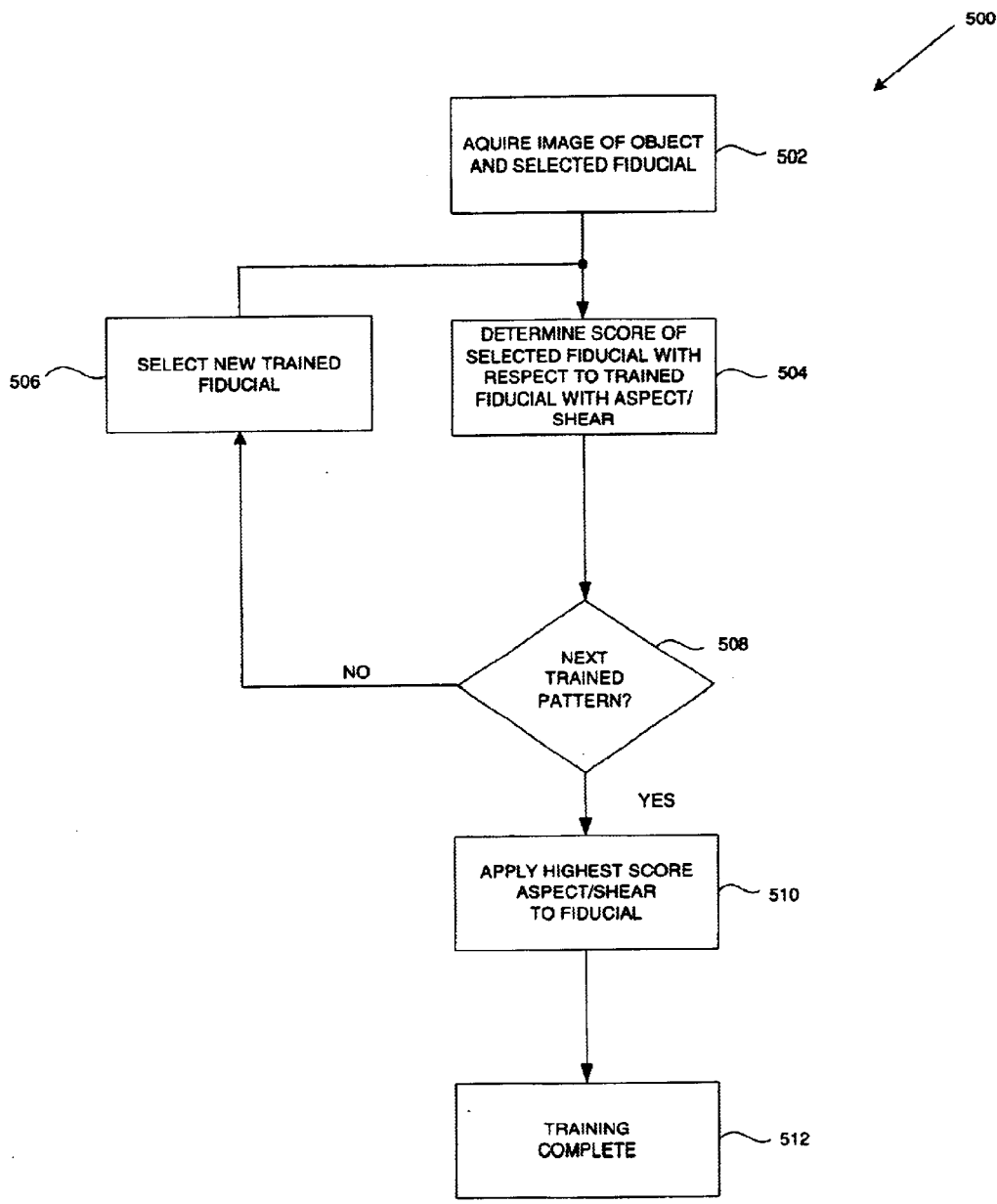
FIG. 5 is a flow diagram detailing a procedure for measuring aspect and shear in an object based upon patterns trained according to the procedure of FIG. 2 employing a single pattern on the object.

A general procedure for computing six-degree-of-freedom pose using a single fiducial or pattern is described in FIG. 5. The procedure 500, first acquires an image of the object and an associated fiducial or pattern (step 502). The search tool is,run using trained patterns at all the various poses, or appropriate transforms of the basic pattern for differing aspect/shear values. Each run results in the determination of a score for the trained fiducial with respect to the runtime image (step 504—described further below).

The procedure repeats, selecting a new trained pattern (step 506) until all relevant training patterns have been run by the search tool (decision step 508). The aspect/shear corresponding to the run pattern with the highest score is then selected (step 510). From this value, the relative pose of the underlying object can be derived by appropriate transforms (step 512).

To determine the highest score for aspect and shear, two alternative techniques—parabolic fit or gradient descent—can be employed.

Figure 6:
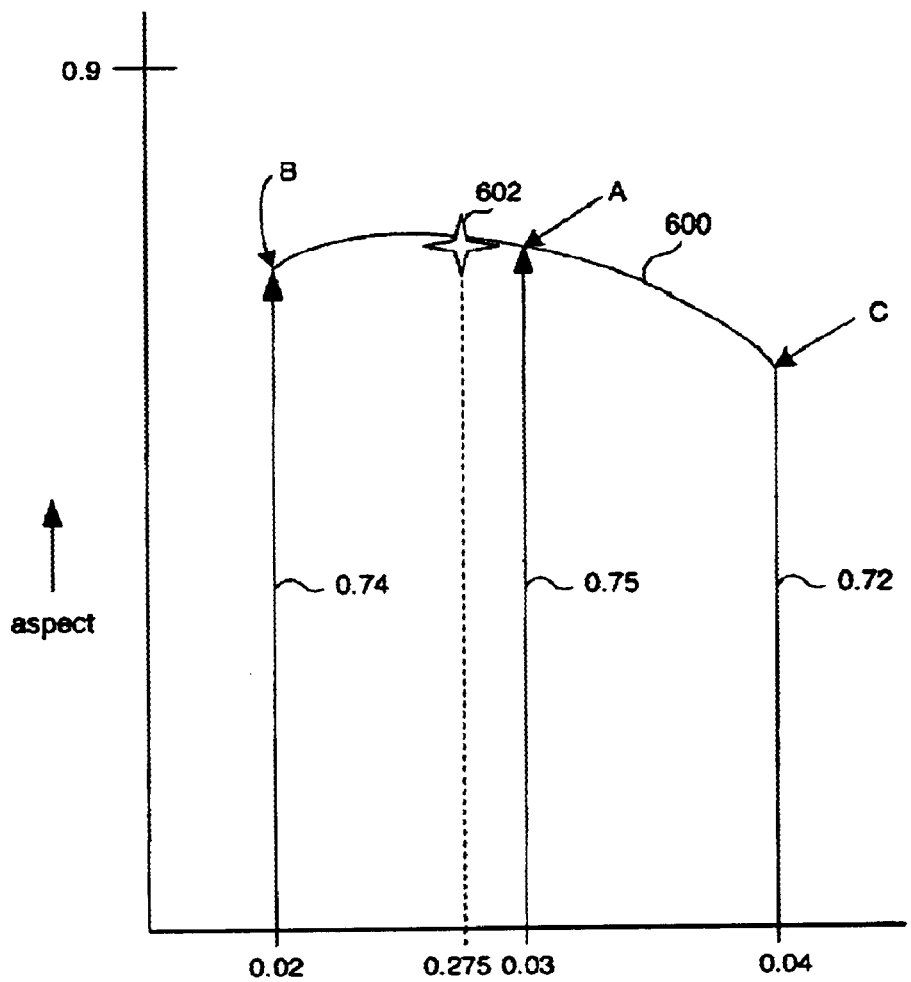
FIG. 6 is a graph of an exemplary parabolic fit procedure for scoring a plurality of search results based upon aspect and shear according to the embodiment FIG. 5.

A parabolic fit of the scores associated with the "highest scoring pattern" and the "neighboring patterns" in aspect and shear can be employed with reference to FIG. 6. For example, if pattern A (shear=0.03, aspect=0.09) had the highest score (0.75), then consider the two scores associated with the two adjacent patterns in the shear direction (pattern B (shear=0.02, aspect=0.09) score=0.74 and pattern C (shear=0.04, aspect=0.09) score=0.72), then a parabola 600 is scribed through the three numbers to locate the is maximum value (star 602). Interpolation can be used to compute this value, approximately shear=0.0275 in this example. Note that parabolic fit techniques can be applied generally to refine the other variables for a given six-degree-of-freedom object pose (x, y, z(scale) and θ), in addition to shear and aspect according to this embodiment.

Note that the x, y, z(scale) and θ variables are refined using bilinear interpolation of the x, y, z(scale) and θ variables of the search result associated with the four "neighboring patterns" in aspect and shear. This bilinear interpolation can be based upon the scores of the search results or it can be based upon the differences between the "peak" aspect/shear values and the aspect/shear values of the neighboring patterns.

In addition, an exemplary computer-readable code expression for determining the parabolic peak can be written as follows:

```
double cfParabolicPeakPosition(double originalValue, double left,
    double
center, double right, double stepSize )
{
double numer, denom;
numer = right - left;
denom = (2*center - right - left)*2;
if (denom == 0.0)
    return(originalValue);
else
    return(originalValue + stepSize * numer/denom);
}
```

According to an alternate embodiment a gradient descent (discussed in further detail below based upon three fiducials) can be employed to search for the "optimal shear and aspect." The procedure starts with the value for shear/aspect corresponding to the pattern exhibiting the highest score, then the procedure would compute scores for shear/aspect nearby this start configuration, and updates the shear/aspect configuration until the computed score no longer increases.

Note that the "derivatives" dScore/dShear, and dScore/dAspect can be numerically computed to improve the efficiency of the gradient descent procedure above. It is contemplated that certain commercially available search tools enable a user to specify values for shear/aspect with respect to an acquired image. Accordingly the search tool procedure can be run on the runtime image while slightly modifying the shear and aspect associated with this runtime image. This process allows the computation of scores without training the tool based upon multiple shear/aspect patterns. Rather, the tool is run with different inputs of aspect/shear (pan and tilt), and the scoring is computed for each search result therefrom. Note that gradient descent techniques can be applied generally to refine the other variables for a given six-degree-of-freedom object pose (x, y, z(scale) and θ), in addition to shear and aspect according to this embodiment.

Figure 7:
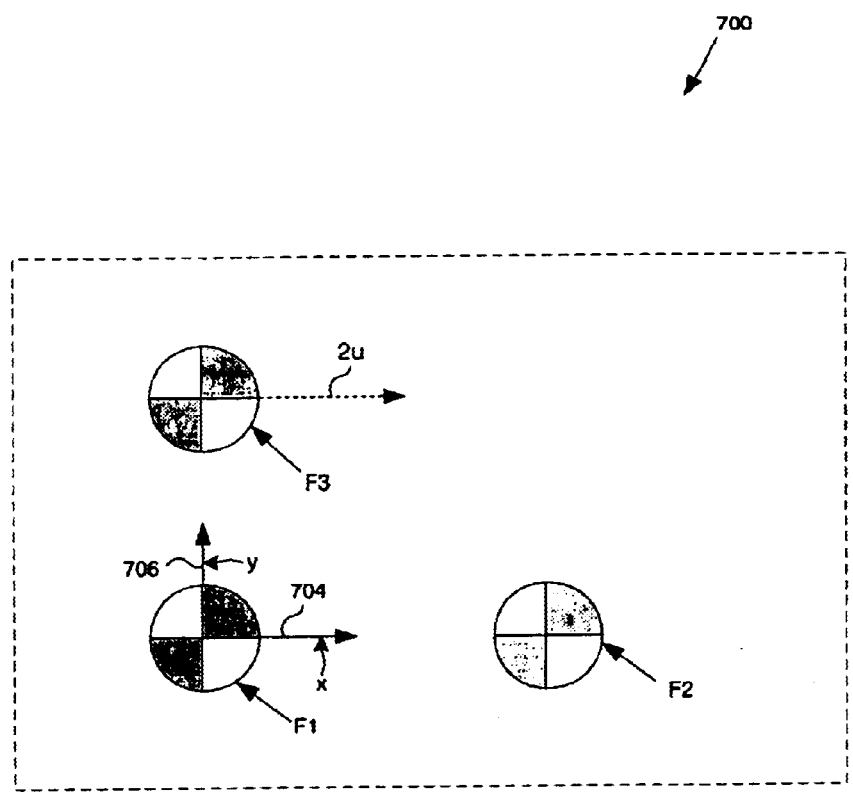
FIG. 7 is a plan view of an exemplary multiple-pattern layout for measuring aspect and shear according to an alternate embodiment of this invention.
Figure 8:
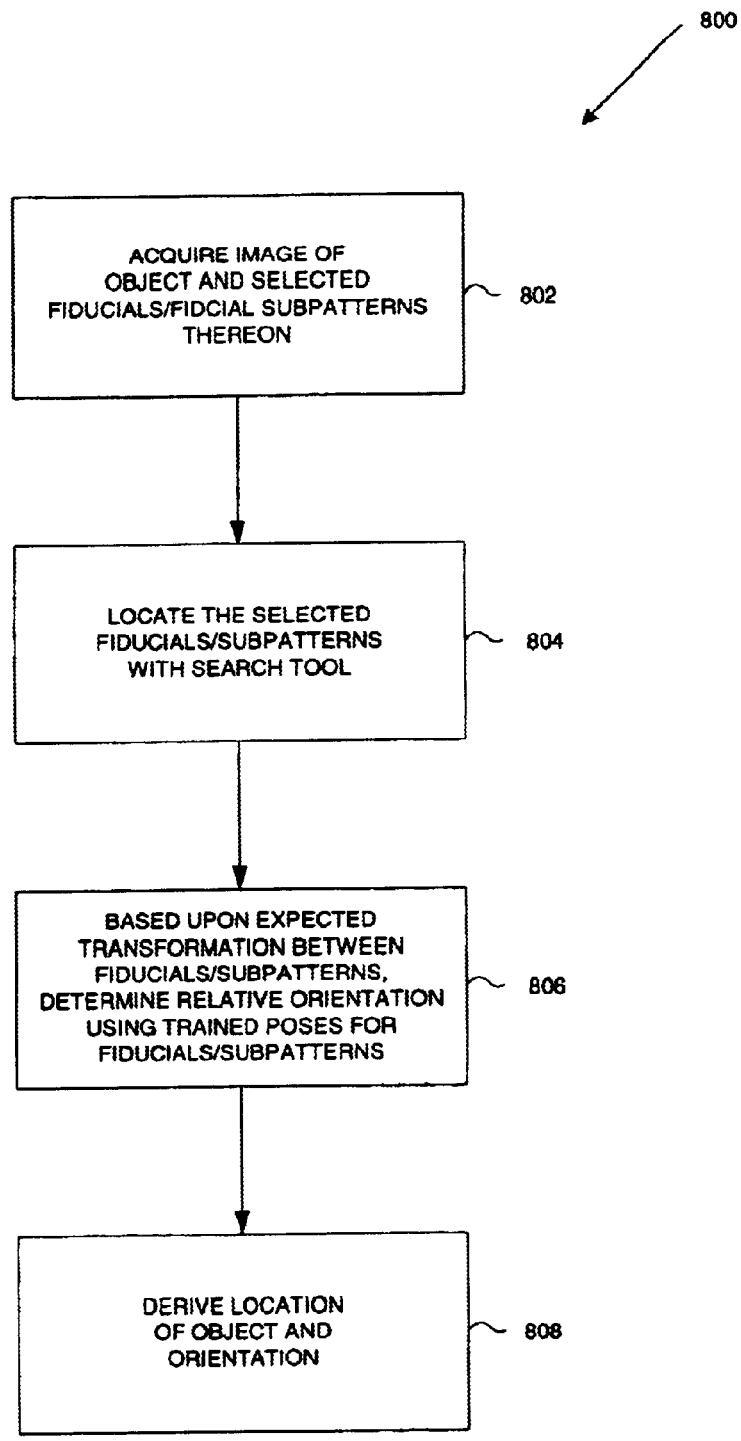
FIG. 8 is a flow diagram detailing a procedure for measuring aspect and shear in an object based upon patterns trained according to the procedure of FIG. 2 employing the multiple-pattern layout of FIG. 7.

An alternate embodiment for computing six-degree-of-freedom pose is now described. The example herein is based upon three discrete fiducials/patterns on the object. FIG. 7 shows an exemplary group of three fiducials F1, F2 and F3, on the surface 700 of an object. Similarly, a procedure for locating and measuring aspect and shear based upon multiple fiducials (F1, F2, F3) is shown in FIG. 8. In general, the procedure 800 entails the use of multiple search tool targets (either different fiducials or subpatterns on the same fiducial) in order to provide multiple location measurements. First, the search tool acquires one or more images of the object containing the target fiducial(s) or fiducial subpatterns (step 802).

According to procedure (refer to step 804 in FIG. 8), the fiducials F1, F2 and F3 are located by the search tool in the acquired image(s) of the object 700. The locations of these fiducials have been determined using the scoring techniques, using search tool results for the fiducials exhibiting the best respective scores. Assume that the expected relative positions, scales, and orientations between the fiducial(s)/subpatterns are known in advance by the procedure—having been accurately measured on the object to be located. In the case of subpatterns, the search tool is trained to locate selected subpatterns of the fiducial, as described above. Note that the procedure would then be provided with the expected relative positions between the subpatterns.

It is often desirable to generate multiple search tool results representing different pan and tilt angles for the trained patterns/fiducial, and select the search tool result having the best score for the respective pattern/fiducial, based upon the closest aspect and shear fit with the imaged fiducial/pattern on the object. Where multiple search results are present, and a single result is to be employed, the search result having the highest "score" typically provides the preferred solution—where score is generally based upon viewing different aspect/shear patterns (e.g. different degrees of pan and tilt) and finding the instance that is the highest-scoring/most-robust of the patterns. Score can be computed as a function of coverage or fit error between the trained pattern and the runtime instance of the pattern. For the exemplary Patmax® search tool, score would be computed as:

coverage/(1+fit error).

Having determined locations according to highest score of multiple search results, the overall procedure can now combine the best-scoring search results to determine the position of the object in six degrees of freedom with respect to expected transformation between the multiple fiducials/patterns (step 806).

By way of example, assume that F2's expected position is exactly 60 scaled units to the right of F1 along F1's x-axis (704) as taken from an arbitrary center point on F1. A scaled unit is one in which the measured distance is divided by the measured scale of F1. If F2's measured position (relative to F1) is 56 scaled units, then the aspect ratio is 56/60.

Furthermore, assume F3's expected position is exactly 40 scaled units above F1's x-axis (along y-axis (706)). Then, if F3's measured position is 40 scaled units above F1 along its x-axis, and 2 scaled units to the right (arrow 2u) of F1's y-axis, then resulting the shear ratio would be 2/40.

More generally, the procedure of this embodiment attempts to solve for aspect and shear given the measured relative positions of F2 and F3 and their expected relative positions. It is contemplated that a single search result, extracted from a plurality of search results obtained at different pan and tilt angles, can be used to compute the six-degree-of-freedom pose. The procedure for selecting the best search result is described further below. However, the general computation of the orientation of the object based upon multiple fiducials is first described as follows:

By way of example, now consider the relative positions normFid21, normFid31 between F2 and F1 and F3 and F1 normalized by the orientation and scale of F1

Let R be the rotation matrix which rotates a point by the opposite of F1's measured orientation characterized as follows:

$$\begin{vmatrix} \cos(-\text{angle\_F1}) & -\sin(-\text{angle\_F1}) \\ \sin(-\text{angle\_F1}) & \cos(-\text{angle\_F1}) \end{vmatrix}$$

Next, let S be the scale matrix which scales points by the opposite of F1's measured scale. S is defined as follows:

$$\begin{vmatrix} 1/\text{scale\_F1} & 0 \\ 0 & 1/\text{scale\_F1} \end{vmatrix}$$

Then, the following expression is provided:

NormFid21=$R*S*[(x, y)\_F2-(x, y)\_F1]$

NormFid31=$R*S*[(x, y)\_F3-(x, y)\_F1]$

Assume that the expected relative positions of F3 and F2 are provided as ExpectedFid21, ExpectedFid31.

Assume also that that there is a linear transform between the expected relative positions and the normalized measured relative positions and let M be a 2×2 matrix corresponding to that linear transform. Matrix M is defined by:

$$\begin{vmatrix} A & B \\ C & D \end{vmatrix}$$

Then:

NormFid21=$M*$ExpectedFid21

NormFid31=$M*$ExpectedFid31

Since each point has two coordinates (x, y), the above two expressions correspond to the following four equations:

NormFid21.$x=A*$ExpectedFid21.$x+B*$ExpectedFid21.$y$

NormFid21.$x=C*$ExpectedFid21.$x+D*$ExpectedFid21.$y$

NormFid31.$x=A*$ExpectedFid31.$x+B*$ExpectedFid31.$y$

NormFid31.$x=C*$ExpectedFid31.$x+D*$ExpectedFid31.$y$

The equations are rearranged so that there are two equations about A and B and two equations about C and D as follows:

NormFid21.$x=A*$ExpectedFid21.$x+B*$ExpectedFid21.$y$

NormFid31.$x=A*$ExpectedFid31.$x+B*$ExpectedFid31.$y$

NormFid21.x=C*ExpectedFid21.x+D*ExpectedFid21.y

NormFid31.x=C*ExpectedFid31.x+D*ExpectedFid31.y

Given two linear equations in two unknowns (A, B) or (C, D), it is well-known how to solve for (A, B) and (C, D).

The (A, B, C, D) matrix M can be composed with F1's rotation scale matrix to provide a full four-degree-of-freedom rotation matrix. When composed with F1's translation vector, this provides a full six-degree-of-freedom matrix measurement.

Having computed the six-degree-of-freedom orientation using either a single fiducial/pattern, or multiple fiducials/patterns above, the prevailing six-degree-of-freedom pose (location and orientation) of the object can now be determined by applying appropriate transforms based upon the known position/translation of selected fiducials patterns on the object (step 808).

Note that the use of three fiducials F1, F2, F3 as described above generally enables measurement of the prevailing aspect and shear, therefore allowing for correction of the training fiducial's pose. It is possible to train on one of the three fiducials and run the procedure on the other two fiducials provided that the expected relative position of the other two to the training fiducial is known. If not already known, the relative positions should be ascertained during the training procedure through manual or automated procedures.

Finally, it is contemplated, according to an alternate embodiment that the principles described herein can be applied to a search tool having the basic capability to register transformation in as little as two translational (x, y) degrees of freedom. To accomplish this, templates are created with varying aspects and shears. Based upon the above description for determining the best scoring aspect/shear, a procedure according to this alternate embodiment now find the best scoring scale, rotation, aspect and shear template. Where parabolic interpolation was employed on neighbors of aspect/shear to refine values for x, y, z(scale) and θ, the procedure of this alternate embodiment uses parabolic interpolation on neighbors of rotation, scale aspect, shear and refines x, y. Accordingly, as generally defined herein, the term "search" tool can also include a basic (x, y) search tool used in conjunction with the procedure of this alternate embodiment.

The foregoing has been a detailed description of a preferred embodiment of the invention. Various modifications and additions can be made without departing from the spirit and scope of this invention. For example, while the image of the object is acquired using a single camera on a single surface, it is expressly contemplated that fiducials/fiducial subpatterns can be located on a plurality of surfaces and imaged by separate cameras in communication with the search tool. Likewise, a plurality of cameras and images can be applied to different parts of the same fiducial or pattern to derive a composite search tool result. Finally, it is expressly contemplated that any of the functions or operations described herein can be performed using hardware, software (e.g. any a computer-readable medium), or a combination of hardware and software. Accordingly, this description is meant to be taken only by way of example, and not to otherwise limit the scope of the invention.

What is claimed is:

1. A system for registering an object in six degrees of freedom using a machine vision system comprising:

a search tool of the machine vision system adapted to recognize a plurality of instances of a trained pattern, the plurality of instances each being transformed to exhibit different amounts of aspect and shear and to provide a plurality of search results corresponding, respectively, to the plurality of instances of the trained pattern; and a combiner that combines the plurality of search results, wherein found relative positions of the instances of the trained pattern are compared with known relative positions of the instances of the trained pattern so as to provide a location of the object in the six degrees of freedom.

2. The system as set forth in claim 1 wherein the combiner includes a linear transform between the expected relative position of each of the instances of the trained pattern and a normalized measured position of the instances of the trained pattern.

3. The system as set forth in claim 1 wherein the plurality of instances of the trained pattern comprise a plurality of transposed, synthetically generated image data, and the different amounts of aspect and shear are based upon predetermined known increments.

4. The system as set forth in claim 1 wherein the plurality of instances of the trained pattern comprise a plurality of different user-specified values for aspect and shear provided at runtime to the search tool so as to change an orientation of the trained pattern.

5. The system as set forth in claim 1 wherein the plurality of instances of the trained pattern each comprise portions of an overall pattern.

6. A method for registering an object in six degrees of freedom using a machine vision system comprising:

recognizing, with a search tool of the machine vision system, a plurality of instances of a trained pattern, the plurality of instances each being transformed to exhibit different amounts of aspect and shear;

providing, from the search tool, a plurality of search results corresponding, respectively, to the plurality of instances of the trained pattern; and combining the plurality of search results, including comparing found relative positions of the instances of the trained pattern with known relative positions of the instances of the trained pattern so as to provide a location of the object in the six degrees of freedom.

7. The method as set forth in claim 6 wherein the step of combining includes applying a linear transform between the expected relative position of each of the instances of the trained pattern and a normalized measured position of the instances of the trained pattern.

8. The method as set forth in claim 6 further comprising scoring each of the plurality of search results and selecting a best scoring of the search results for combining by the step of combining.

9. The method as set forth in claim 6 wherein the plurality of instances of the trained pattern comprise a plurality of transposed, synthetically generated image data, and the different amounts of aspect and shear are based upon predetermined known increments.

10. The method as set forth in claim 6 wherein the plurality of instances of the trained pattern comprise a plurality of different user-specified values for aspect and shear provided at runtime to the search tool so as to change an orientation of the trained pattern.

11. The method as set forth in claim 6 wherein the plurality of instances of the trained pattern each comprise portions of an overall pattern.

12. A computer-readable medium including program instructions executed on a computer for registering an object in six degrees of freedom using a machine vision system, the computer-readable medium including program instructions for performing the steps of:

recognizing, with a search tool of the machine vision system, a plurality of instances of a trained pattern, the plurality of instances each being transformed to exhibit different amounts of aspect and shear;

providing, from the search tool, a plurality of search results corresponding, respectively, to the plurality of instances of the trained pattern; and combining the plurality of search results, including comparing found relative positions of the instances of the trained pattern with known relative positions of the instances of the trained pattern so as to provide a location of the object in the six degrees of freedom.

13. The computer-readable medium as set forth in claim 12 wherein the step of combining includes applying a linear transform between the expected relative position of each of the instances of the trained pattern and a normalized measured position of the instances of the trained pattern.

14. The computer-readable medium as set forth in claim 12 further comprising scoring each of the plurality of search results and selecting best scoring of the search results for combining by the step of combining.

15. The computer-readable medium as set forth in claim 12 wherein the plurality of instances of the trained pattern comprise a plurality of transposed, synthetically generated image data, and the different amounts of aspect and shear are based upon predetermined known increments.

16. The computer-readable medium as set forth in claim 12 wherein the plurality of instances of the trained pattern comprise a plurality of different user-specified values for aspect and shear provided at runtime to the search tool so as to change an orientation of the trained pattern.

17. The computer-readable medium as set forth in claim 12 wherein the plurality of instances of the trained pattern each comprise portions of an overall pattern.

* * * * *

(12) INTER PARTES REEXAMINATION CERTIFICATE (0342nd)
United States Patent
Wallack

(10) Number: US 6,771,808 C1
(45) Certificate Issued: Jan. 31, 2012

(54) SYSTEM AND METHOD FOR REGISTERING PATTERNS TRANSFORMED IN SIX DEGREES OF FREEDOM USING MACHINE VISION

(75) Inventor: Aaron S. Wallack, Natick, MA (US)

(73) Assignee: Cognex Corporation, Natick, MA (US)

Reexamination Request:
No. 95/001,176, Jun. 15, 2009

Reexamination Certificate for:
Patent No.: 6,771,808
Issued: Aug. 3, 2004
Appl. No.: 09/737,836
Filed: Dec. 15, 2000

(51) Int. Cl.
*G06K 9/46* (2006.01)
*G06T 3/00* (2006.01)

(52) U.S. Cl. .................. 382/151; 382/215; 382/216; 382/289

(58) Field of Classification Search .................. None
See application file for complete search history.

(56) References Cited

To view the complete listing of prior art documents cited during the proceeding for Reexamination Control Number 95/001,176, please refer to the USPTO's public Patent Application Information Retrieval (PAIR) system under the Display References tab.

*Primary Examiner* — Colin LaRose

(57) ABSTRACT

A system and method for utilizing a search tool that registers transformation of a trained pattern by at least four degrees of freedom to register the instance of a pattern in an arbitrary six-degree-of-freedom pose is provided. The search tool is first trained to recognize a plurality of versions of a trained pattern/fiducial that are incrementally transposed to induce differing levels of known aspect and shear. An object having several instances of the trained pattern located at known spacings and orientations therebetween is imaged by the trained search tool, and the located instances of the trained pattern are compared to expected instances of the trained pattern to measure relative six-degree-of-freedom orientation for the underlying object.

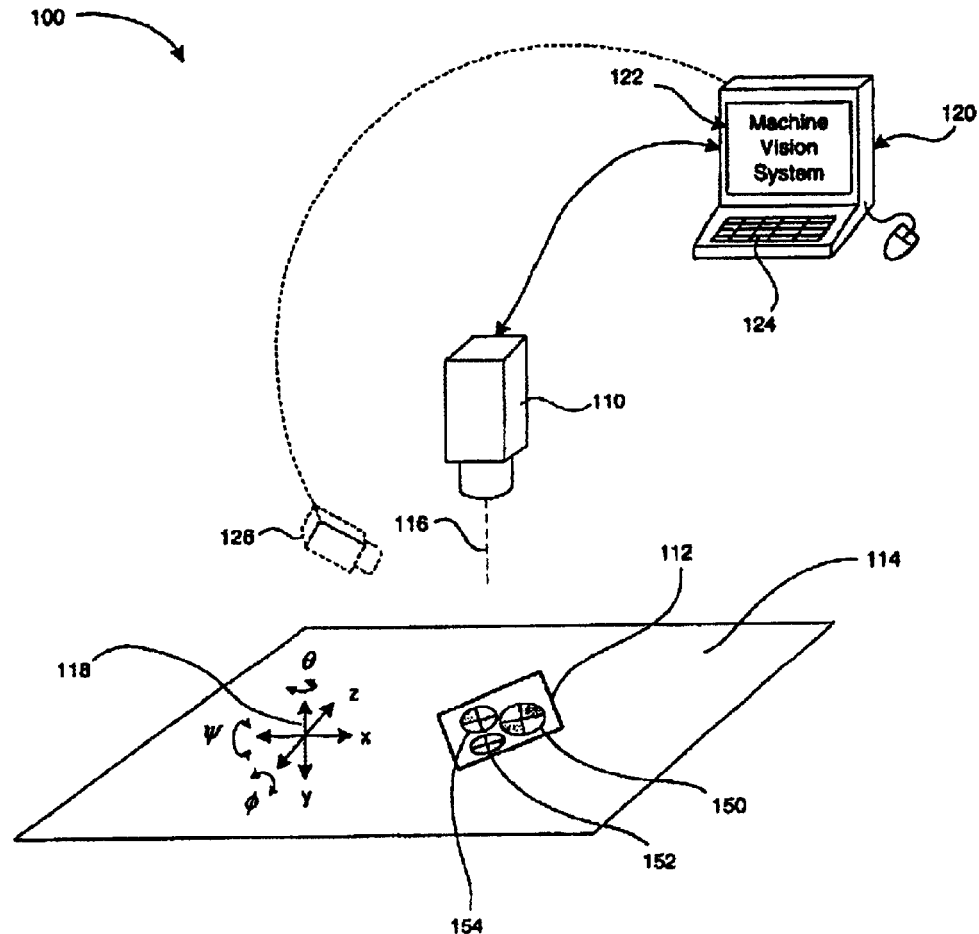

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 6, 8-12 and 14-17 is confirmed.

Claims 1-5, 7 and 13 were not reexamined.

\* \* \* \* \*